United States Patent
Lee

(10) Patent No.: US 10,491,820 B2
(45) Date of Patent: Nov. 26, 2019

(54) PORTABLE DEVICE AND METHOD FOR CONTROLLING SCREEN IN THE PORTABLE DEVICE

(71) Applicant: Samsung Electronics Co., Ltd., Gyeonggi-do (KR)

(72) Inventor: Joo-Ho Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/792,030

(22) Filed: Oct. 24, 2017

(65) Prior Publication Data

US 2018/0115713 A1 Apr. 26, 2018

(30) Foreign Application Priority Data

Oct. 25, 2016 (KR) .................. 10-2016-0139325

(51) Int. Cl.
| | |
|---|---|
| *H04N 5/232* | (2006.01) |
| *H04N 1/00* | (2006.01) |
| *G06F 3/0484* | (2013.01) |
| *G06F 3/0481* | (2013.01) |
| *G06F 3/0488* | (2013.01) |

(Continued)

(52) U.S. Cl.
CPC ........ *H04N 5/23245* (2013.01); *G06F 1/1686* (2013.01); *G06F 3/04817* (2013.01); *G06F 3/04847* (2013.01); *G06F 3/04883* (2013.01); *H04N 1/00437* (2013.01); *H04N 5/2258* (2013.01); *H04N 5/23216* (2013.01); *H04N 5/23293* (2013.01)

(58) Field of Classification Search
CPC ............. H04N 5/2258; H04N 5/23245; H04N 5/23216; H04N 5/23293; H04N 1/00411; H04N 1/00437; G06F 3/04817; G06F 3/0484; G06F 3/04847
See application file for complete search history.

(56) References Cited

U.S. PATENT DOCUMENTS

| 2009/0150829 A1 | 6/2009 | Lee |
| 2012/0038747 A1 | 2/2012 | Kim et al. |
| 2013/0138723 A1 | 5/2013 | Ku et al. |

(Continued)

FOREIGN PATENT DOCUMENTS

EP        2 854 002        4/2015

OTHER PUBLICATIONS

International Search Report dated Jan. 30, 2018 issued in counterpart application No. PCT/KR2017/011807, 10 pages.

(Continued)

*Primary Examiner* — Daniel M Pasiewicz
(74) *Attorney, Agent, or Firm* — The Farrell Law Firm, P.C.

(57) ABSTRACT

A portable device and method for controlling a screen in the portable device are provided. More specifically, a portable device for, upon termination of a camera application, displaying a shortcut icon corresponding to the last operated camera on a home screen, and a method for controlling a screen in the portable device are provided. A portable device for, upon termination of a camera application, displaying a shortcut icon corresponding to the last operated camera between a front camera and a rear camera on a home screen, and a method for controlling a screen in the portable device are provided.

17 Claims, 16 Drawing Sheets

(51) Int. Cl.
*H04N 5/225* (2006.01)
*G06F 1/16* (2006.01)

(56) References Cited

U.S. PATENT DOCUMENTS

| | | |
|---|---|---|
| 2014/0325451 A1 | 10/2014 | Wang et al. |
| 2015/0033163 A1 | 1/2015 | Hinkel |
| 2015/0319364 A1* | 11/2015 | Jin .................... H04N 5/23245 |
| | | 348/220.1 |
| 2016/0127652 A1 | 5/2016 | Park et al. |
| 2016/0162132 A1 | 6/2016 | Janakiraman et al. |
| 2016/0180845 A1* | 6/2016 | Kim ..................... G06F 3/167 |
| | | 348/211.2 |
| 2016/0196048 A1 | 7/2016 | Khoury et al. |
| 2018/0084397 A1* | 3/2018 | Sato .................... H04W 8/005 |

OTHER PUBLICATIONS

European Search Report dated Sep. 10, 2019 issued in counterpart application No. 17865118.8-1208, 8 pages.

* cited by examiner

PORTABLE DEVICE AND METHOD FOR CONTROLLING SCREEN IN THE PORTABLE DEVICE

PRIORITY

This application claims priority under 35 U.S.C. § 119(a) to Korean Patent Application Serial No. 10-2016-0139325, which was filed in the Korean Intellectual Property Office on Oct. 25, 2016, the entire content of which is incorporated herein by reference.

BACKGROUND

1. Field of the Disclosure

The present disclosure relates to a portable device and a method for controlling a screen in the portable device, and more particularly, to a portable device for, upon termination of a camera application, displaying a shortcut icon corresponding to the last operated camera on a home screen, and a method for controlling a screen in the portable device.

2. Description of Related Art

Recently, portable devices have added more services, functions, and additional multitasking capacity. Portable devices now support cameras with high resolutions. The typical number of cameras per device has increased from one camera per device in the past to currently three cameras per device.

When a user takes a picture using a camera of a portable device, the user may first execute a camera application and then select either the front camera or the rear camera to take a picture or video.

The last camera the user took a picture with may only be known when the camera application is executed. If the user wants to take a self-portrait photograph (selfie) through the front camera, the user may select the front camera through the camera application.

SUMMARY

An aspect of the present disclosure is to address at least the above mentioned problems and/or disadvantages and to provide at least the advantages described below. Accordingly, an aspect of the present disclosure is to provide a portable device for, upon termination of a camera application, displaying a shortcut icon corresponding to the last operated camera on a home screen, and a method for controlling a screen in the portable device.

In accordance with an aspect of the present disclosure, there is a portable device that includes a plurality of cameras, a touch screen for displaying a first shortcut icon representing a camera application, and a controller for controlling the plurality of cameras and the touch screen. The controller executes the camera application in response to a user input to the first shortcut icon, and upon termination of the camera application, controls the first shortcut icon to be changed to a second shortcut icon representing the last operated camera.

In accordance with an aspect of the present disclosure, there is provided a method for controlling a screen in a portable device having a plurality of cameras. The method includes receiving a first user input to a first shortcut icon representing a camera application displayed on a home screen of the portable device, operating one of a front camera and a rear camera in response to the first user input, terminating the camera application in response to a second user input, and upon termination of the camera application, changing the first shortcut icon to a second shortcut icon representing the last operated camera.

BRIEF DESCRIPTION OF THE DRAWINGS

The above and other aspects, features and advantages of embodiments of the present disclosure will be more apparent from the following description taken in conjunction with the accompanying drawings, in which.

Throughout the drawings, like reference numerals may be understood to refer to like parts, components, and structures.

DETAILED DESCRIPTION

Figure 1A:
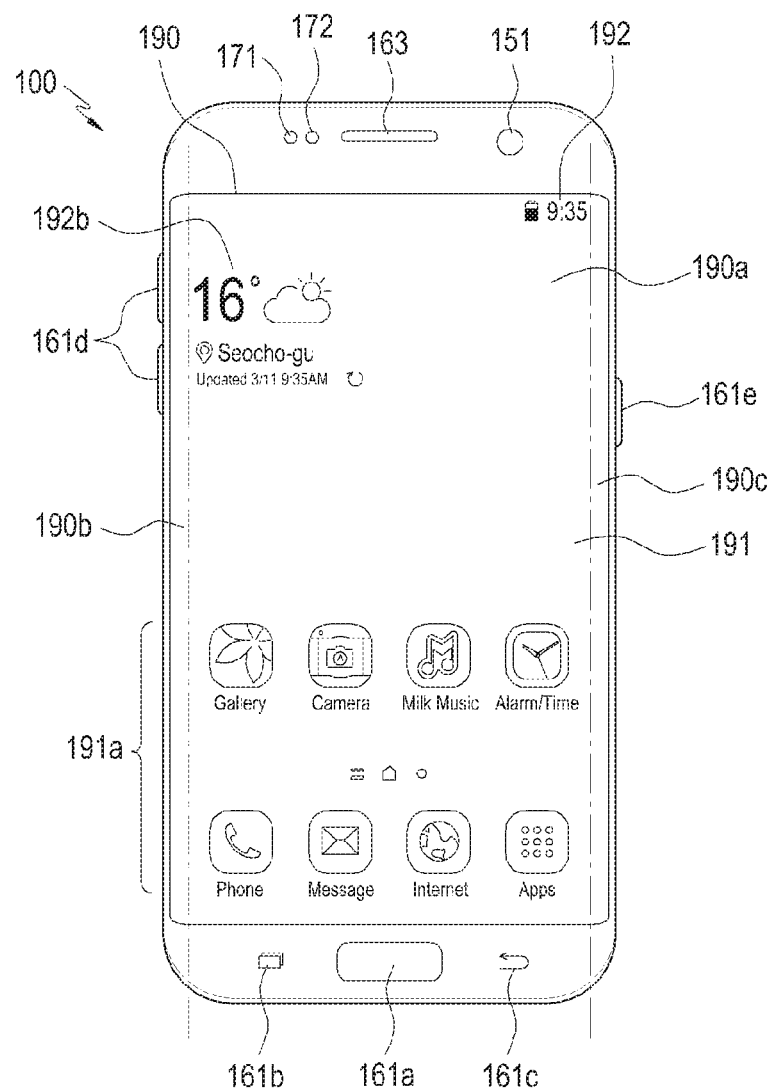
FIGS. 1A and 1B are front and rear views illustrating a portable device according to an embodiment of the present disclosure.

Embodiments of the present disclosure are described with reference to the accompanying drawings. In addition, a method for manufacturing and using the present disclosure is described in detail with reference to the accompanying drawings. Terms including ordinal numbers such as 'first' and 'second' may be used to describe various components, not limiting the components. These expressions are used to distinguish one component from another component. For example, a first component may be referred to as a second component and vice versa without departing from the scope of the present disclosure. The term "and/or" covers a combination of a plurality of items or any of the plurality of items.

According to an embodiment of the present disclosure, a touch screen may include an edged touch screen with at least one of the sides being edged, and a flat touch screen.

An application refers to software that is executed on at least one of an operating system (OS) for computers, an embedded OS, and a mobile OS, and used by a user. For example, applications may include a Web browser, a camera application, a mobile payment application (for example, an electronic payment application, a payment application, and the like), a photo album application, a word processor, a spread sheet, a contacts application, a calendar application, a memo application, an alarm application, a social networking service (SNS) application, a call application, a game store, a game application, a chatting application, a map application, a music player, a video player, and the like.

Content may be executed or displayed through an application. For example, content may include a video file or audio file reproduced by a video player, a game file executed in a game application, a music file reproduced by a music player, a photo file displayed in a photo album application, a Web page displayed on a Web browser, payment information (for example, a mobile card number, a pre-paid amount, the name of goods, a service name, a store name, and the like) displayed in an electronic payment application, and the like. In addition, content may include a call screen (for example, a caller identifier (ID), a caller name, the starting time of a call, a caller video (or caller image) during a video call, and the like) displayed in a call application.

Content may include an executed application screen, and a user interface (UI) included in the application screen. Further, the content may include one or more pieces of content.

A widget is a mini application which is part of a graphic user interface (GUI) supporting active interaction between a user, an application, and an OS. For example, a weather widget, a calculator widget, a clock widget, and the like may be provided.

In embodiments of the present disclosure, the term 'user input' may cover a user's selection of a shortcut icon or icon, a user's pressing of a shortcut icon, a user's touch on a shortcut icon, a user's touch (including a contactless touch such as hovering) received or detected in a shortcut icon on a touch screen, a user's touch gesture (including a contactless touch such as hovering, a user's voice, selection of a button, selection of a key (for example, a key in a keypad), presence of a user (for example, within a camera's recognition range), and the like), received or detected in a shortcut icon on a touch screen, a user's motion, and the like.

The terms used in the present disclosure are provided to describe embodiments, and are not intended to restrict and/or limit the present disclosure. It is to be understood that singular forms include plural referents unless the context clearly dictates otherwise. In the present disclosure, the terms 'have', 'may have', 'include', or 'may include' signify the presence of a specific feature, number, step, operation, component, part, or a combination thereof, not excluding the presence or addition of one or more other features, numbers, steps, operations, components, parts, or combinations of them.

Figure 1B:
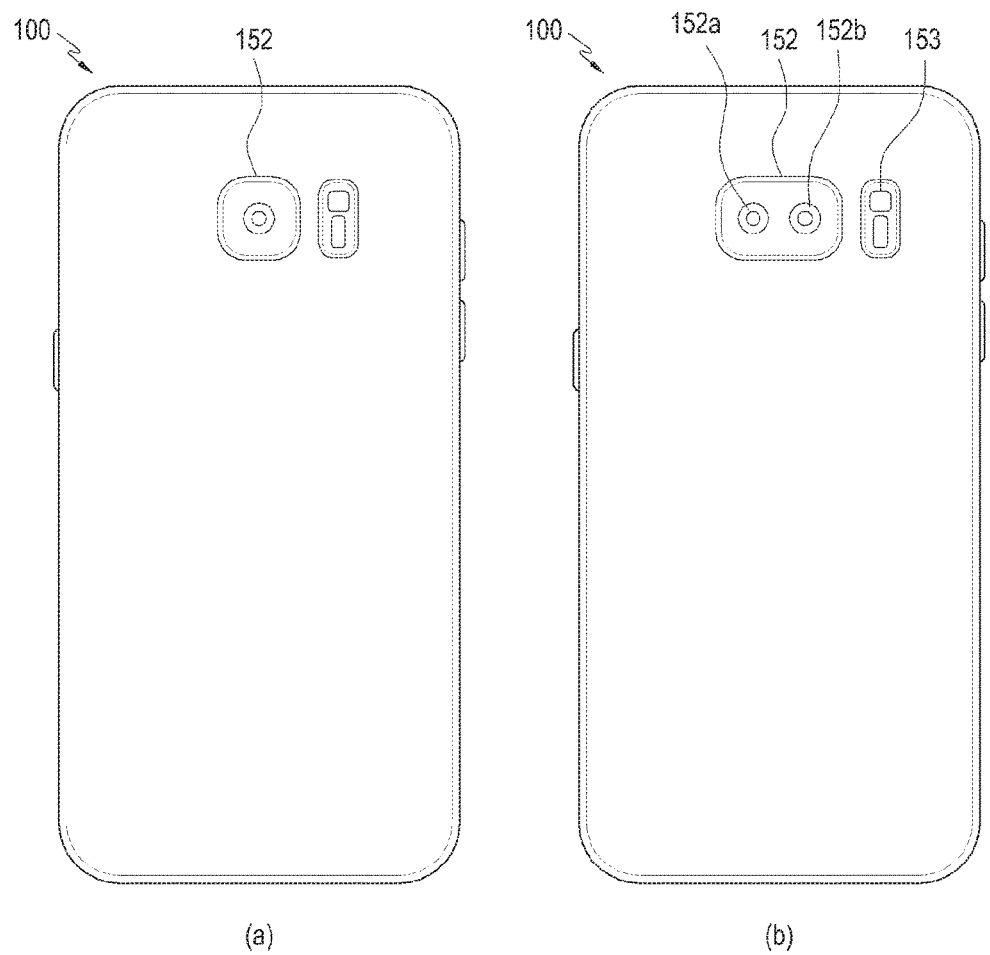

FIGS. 1A and 1B are front and rear views illustrating a portable device according to an embodiment of the present disclosure.

Referring to FIGS. 1A and 1B, a touch screen 190 is disposed at the center of the front surface of a portable device 100. The touch screen 190 may include a flat touch screen or an edged touch screen. The touch screen 190 is shown as an edged touch screen in FIG. 1A.

The touch screen 190 may be a bendable display panel. The touch screen 190 may include a bendable touch panel corresponding to a bendable display panel. In addition, an edged touch screen is shown in FIGS. 1A and 1B, should not be construed as limiting the present disclosure. For example, a flat touch screen may be disposed at the center of the front surface of the portable device 100. The touch screen may be a flat display panel. The touch screen may include a flat touch panel corresponding to the flat display panel.

As the touch screen 190 may be formed as an edged touch screen using a thin flexible printed circuit board (FPCB), the touch screen 190 may be curved or bent. The touch screen 190 may include a main touch screen 190a, and edged touch screens 190b and 190c which are integrally formed. In the touch screen 190, the main touch screen 190a may be separated from at least one of the left and right edged touch screens 190b and 190c.

The touch screen 190 includes the main touch screen 190a, and may include one of the left edged touch screen 190b and the right edged touch screen 190c.

In FIG. 1A, a home screen 191 is displayed on the touch screen 190. The home screen 191 may include a plurality of home screens. Shortcut icons 191a representing applications selectable by a user input (for example, a user touch, hovering, and the like) on the home screen 191, a weather widget 192b, and a clock widget may be displayed on the home screen 191.

A status bar 192 may be displayed at a top end of the home screen 191, indicating the statuses of the portable device 100 such as a battery charged state, a received signal strength, the current time, and the like. Further, the home screen 191 of the portable device 100 may be positioned under the status bar 192, or the home screen 191 may be displayed without the status bar 192.

A first camera 151, a speaker 163, a proximity sensor 171, an illumination sensor 172, and the like may be disposed in a top part of the front surface of the portable device 100.

In (a) and (b) of FIG. 1B, a second camera 152 and a flash 153 may be disposed on the rear surface of the portable device 100. The second camera 152 may be a dual camera that includes cameras 152a and 152b. If the second camera 152 is a dual camera, the left camera 152a may be a wide-angle lens camera, and the right camera 152b may be a telephoto lens camera. In addition, if the second camera 152 is a dual camera, the left camera 152a may be a monochrome camera, and the right camera 152b may be a color camera.

A home button or key 161a, a recent apps button or key 161b, and a back button or key 161c may be disposed in a bottom part of the front surface of the portable device 100. The buttons 161a, 161b, and 161c may be configured as touch buttons as well as physical buttons. Further, the buttons 161a, 161b, and 161c may be displayed together with text or other icons on the touch screen 190.

The side surfaces of the portable device 100 connects the front and rear surfaces. A power/lock button 161d and a volume button 161e may be disposed on the side surfaces of the portable device 100.

A microphone 162, a connector 165, and/or the speaker 163 may be positioned at a bottom end of the portable device 100. An insertion hole into which an input pen 167 having a button that is insertable may be disposed at the bottom end of the portable device 100. The input pen 167 may be inserted into the insertion hole and thus kept inside the portable device 100, and may be removed from the portable device 100.

Figure 2:
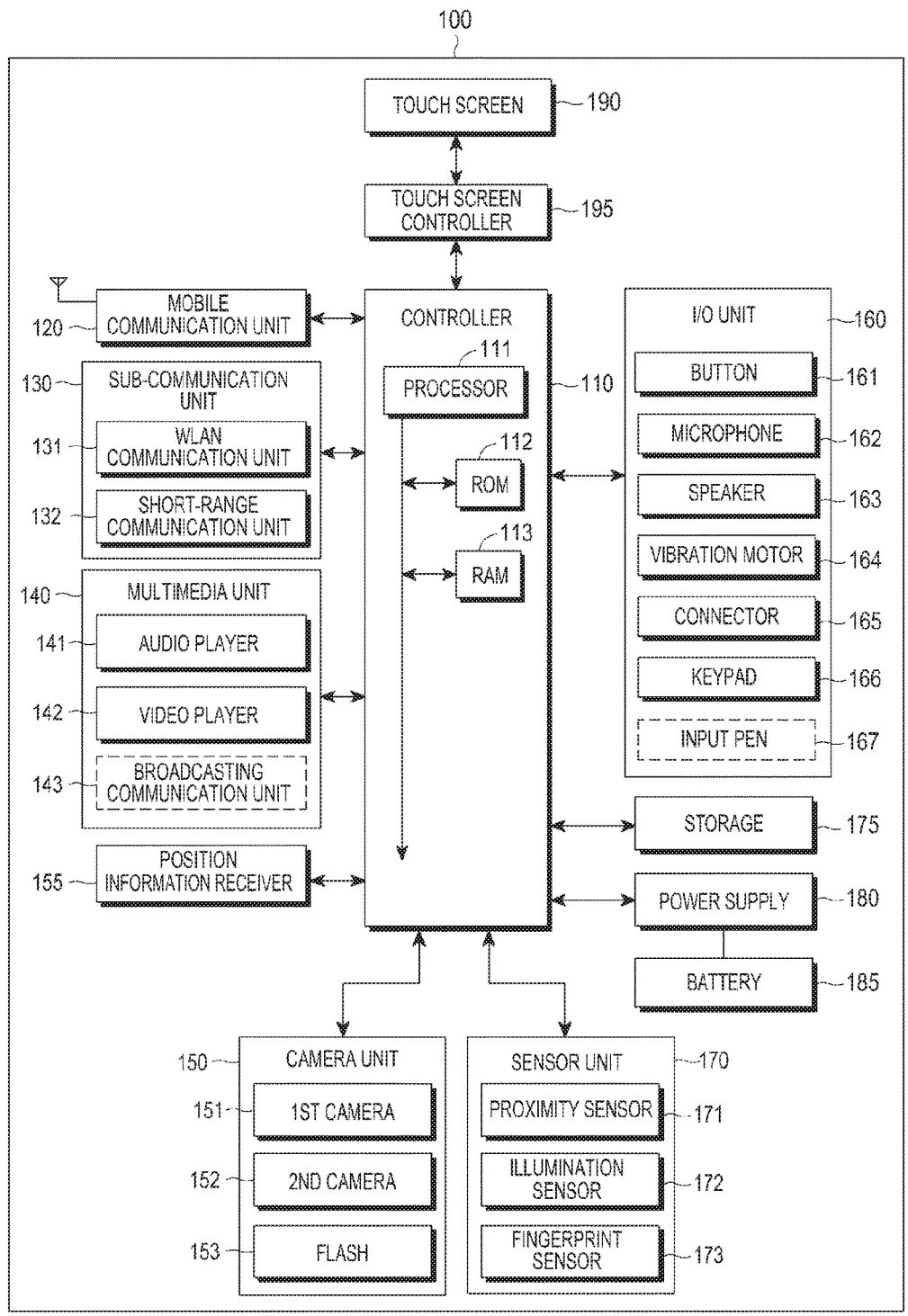
FIG. 2 is a block diagram illustrating a portable device according to an embodiment of the present disclosure.

FIG. 2 is a block diagram illustrating a portable device according to an embodiment of the present disclosure.

Referring to FIG. 2, the portable device 100 may be connected to another device (for example, another portable device, a wearable device, a server, and the like) wirelessly or with wires by means of a mobile communication unit 120, a sub-communication unit 130, and the connector 165.

The portable device 100 may be a portable phone, a smartphone, a tablet device, an MP3 player, a video player, an electronic blackboard, a monitor, an electronic device with a display (for example, a refrigerator, a washer, an air conditioner, and the like), a display device (for example, a TV), and the like.

The portable device 100 may have the touch screen 190, and transmit and receive data or content to and from the outside through the communication unit 120 and sub-communication unit 130. The portable device 100 may include the input pen 167 and the touch screen 190. Further, the portable device 100 may include a display unit (for example, an embodiment in which there is only a display panel without a touch panel).

The portable device 100 may include a controller 110, the mobile communication unit 120, the sub-communication unit 130, a multimedia unit 140, a camera 150, a position information receiver 155, an input/output (I/O) unit 160, a sensor unit 170, a storage 175, a power supply 180, and a battery 185. The portable device 100 may further include the touch screen 190 and a touch screen controller 195.

The controller 110 may include a processor 111. The controller 110 may further include a read only memory (ROM) 112 that stores a control program for controlling the portable device 100, and a random access memory (RAM) 113 used to store a signal and/or data received from the outside of the portable device 100, and used as a storage area for various operations of the portable device 100.

The controller 110 provides overall control to the portable device 100, controls a signal flow between the internal components 110 to 195 of the portable device 100, and processes data. The controller 110 controls power supply to the internal components 120 to 195 by means of the power supply 180 and the battery 195.

The processor 111 may include a graphics processing unit (GPU) for processing graphics. The processor 111 may further include a sensor processor for controlling sensors and a communication processor for controlling communication.

The processor 111 may be implemented as a system on chip (SoC) including a core and the GPU. The processor 111 may include a multi-core processor (e.g., a single core, a dual core, a triple core, a quad core, and the like).

The processor 111, the ROM 112, and the RAM 113 may be interconnected by a bus.

The controller 110 may control the mobile communication unit 120, the sub-communication unit 130, the multimedia unit 140, the camera 150, the position information receiver 155, the I/O unit 160, the sensor unit 170, the storage 175, the power supply 180, the touch screen 190, and the touch screen controller 195.

The controller 110 controls a plurality of cameras and the touch screen that displays a first shortcut icon representing a camera application, executes the camera application in response to a user input to the first shortcut icon, and upon termination of the camera application, controls changing of the first shortcut icon to a second shortcut icon representing the last operated camera among the plurality of cameras.

Upon termination of the camera application, the controller 110 may control the resetting of one or more setting values applied to the last operated camera.

Upon receipt of an additional user input to the second shortcut icon, the controller 110 may control operation of one of the front and rear cameras, corresponding to the second shortcut icon.

The controller 110 may control the display of the first shortcut icon on one of a home screen and a locked screen.

The controller 110 may control the display of the second shortcut icon at the position of the first shortcut icon.

The controller 110 may control the second shortcut icon and the first shortcut icon to be displayed together.

In an embodiment of the present disclosure, the term "controller of the portable device" may mean all of the processor 111, the ROM 112, and the RAM 113. Further, "controller" of the portable device may mean the processor 111.

The mobile communication unit 120 may be connected to another device (for example, another portable device, a server, and the like) through a mobile communication network, using one or more antennas under the control of the controller 110.

The sub-communication unit 130 may be connected to another device (for example, another portable device, a server, and the like) through a wireless local area network (WLAN) communication unit 131 and/or a short-range communication unit 132, using one or more antennas under the control of the controller 110. The sub-communication unit 130 may include a WLAN antenna, a magnetic secure transmission (MST) antenna, a near field communication (NFC) antenna, and the like.

The WLAN communication unit 131 may be connected wirelessly to an access point (AP) in a place where the AP is installed, and is under the control of the controller 110. The WLAN communication unit 131 may support wireless fidelity (Wi-Fi) communication.

Short-range communication may include Bluetooth® communication, Bluetooth low energy (BLE) communication, Infrared Data Association (IrDA), ultra-wideband (UWB) communication, MST communication, and/or NFC.

The portable device 100 may include one or a combination of two or more of the mobile communication unit 120, the WLAN communication unit 131, and the short-range communication unit 132. The term "communication unit" can cover the mobile communication unit 120 and/or the sub-communication unit 130.

The multimedia unit 140 may play audio, play video, and/or receive external broadcasting under the control of the controller 110.

An audio player 141 may reproduce an audio source (for example, an audio file having a file extension of mp3, wma, ogg, or way) pre-stored in the storage 175 or received from the outside, by using an audio codec under the control of the controller 110.

According to embodiments of the present disclosure, the audio player 141 may reproduce auditory feedback corresponding to the determined characteristics of a second area. For example, the audio player 141 may reproduce auditory feedback (for example, output of an audio source stored in the storage 175) corresponding to a determined characteristics of a second area, using the audio codec under the control of the controller 110.

A video player 142 may reproduce a digital video source (for example, a video file having a file extension of mpeg, mpg, mp4, avi, mov, or mkv) pre-stored in the storage 175 or received from the outside, by using a video codec under the control of the controller 110.

According to embodiments of the present disclosure, the video player 142 may reproduce visual feedback corresponding to a determined characteristics of the second area. For example, a visual feedback (for example, output of a video source stored in the storage 175) may be reproduced using the video codec under the control of the controller 110.

A broadcasting communication unit 143 may receive, through an antenna, a broadcast signal (for example, a TV broadcast signal, a radio broadcast signal, a data broadcast signal, and the like) and additional broadcasting information (for example, an electronic program guide (EPG), an electronic service guide (ESG), and the like) transmitted by an external broadcasting station, under the control of the controller 110.

The multimedia unit 140 may include the audio player 141 and the video player 142 without the broadcasting communication unit 143, without affecting the performance or structure of the portable device 100. Further, the controller 110 may be configured to include at least one of the audio player 141 and the video player 142 of the multimedia unit 140.

The camera 150 may capture a still image or a video under the control of the controller 110. The camera 150 may capture an iris under the control of the controller 110.

The camera 150 may include the first camera 151 on the front surface of the portable device 100 and the second camera 152 on the rear surface of the portable device 100. The second camera 152 may be a dual camera including the two cameras 152a and 152b. Further, a third camera for capturing an iris may be positioned at one side of the first camera 151.

One of the first and second cameras 151 and 152 may include an auxiliary light source (for example, the flash 153) for providing enough light intensity to capture an image or video.

The position information receiver 155 periodically receives signals (for example, orbit information about global positioning system (GPS) satellites, time information about the GPS satellites, and a navigation message) from a plurality of satellites flying in Earth's orbit.

The portable device 100 may calculate the locations of each satellite and the portable device 100, using signals received from the plurality of satellites to calculate a distance using a transmission/reception time difference. The location, time, and velocity of the portable device 100 may be calculated by triangulation. An additional satellite may be required for orbit calibration or time calibration.

Indoors, the portable device 100 may detect its location or velocity, using a wireless AP. The indoor location detection of the portable device 100 may be performed by a cell-ID scheme, an enhanced cell-ID scheme, and an angle of arrival (AoA) scheme. In addition, the portable device 100 may detect its location or velocity indoors using a radio beacon.

The I/O unit 160 may include one or more buttons 161, one or more microphones 162, one or more speakers 163, one or more vibration motors 164, the connector 165, a keypad 166, and the input pen 167.

Referring to FIGS. 1A, 1B, and 2, the buttons 161 may include the home button 161a, the recent apps button 161b, and/or the back button 161c in a bottom part of the front surface of the portable device 100. The buttons 161 may include the power/lock button 161d and one or more volume buttons 161e on the portable device 100.

The buttons 161 may be configured as touch buttons as well as physical buttons. Further, the buttons 161 of the portable device 100 may be displayed in the form of text, images, icons, and the like on the touch screen 190. The shapes, positions, functions, names, and the like of the buttons 161 shown in FIGS. 1A and 1B are examples, not limiting the present disclosure, and thus those skilled in the art will readily understand that changes, variations, and modifications may be made to the shapes, positions, functions, names, and the like of the buttons 161.

The controller 110 may receive an electrical signal corresponding to selection of a button 161. The controller 110 may detect a user input using the received electrical signal.

For the input of an external voice or sound, the microphone 162 generates an electrical signal under the control of the controller 110. The electrical signal generated by the microphone 162 may be converted by the audio codec, and stored in the storage 175 and output through the speaker 163, under the control of the controller 110. Referring to FIGS. 1A, 1B, and 2, one or more microphones 162 may be positioned on the front surface, side surfaces, and/or rear surface of the portable device 100.

The speaker 163 may output sounds corresponding to various signals (for example, a wireless signal, a broadcast signal, an audio source, a video file, a photo shot, and the like) decoded by the audio codec under the control of the controller 110.

Referring to FIGS. 1A, 1B, and 2, one or more speakers 163 may be positioned on the front surface, side surfaces, and/or rear surface of the portable device 100. One or more speakers may be positioned on the front surface of the portable device 100. One speaker 163 may be positioned on each of the front and rear surfaces of the portable device 100. Further, a plurality of speakers may be positioned on the side surfaces of the portable device 100.

According to an embodiment of the present disclosure, the speaker 163 may output an auditory feedback sound corresponding to the user selecting a shortcut icon representing the last operated camera. For example, the speaker 163 may output an auditory feedback sound corresponding to the user selecting a shortcut icon representing the last operated camera determined under the control of the controller 110.

The vibration motor 164 may convert an electrical signal to mechanical vibrations under the control of the controller 110. The vibration motor 164 may include a linear vibration motor, a bar-type vibration motor, a coin-type vibration motor, a piezoelectric element vibration motor, and the like.

The vibration motor 164 may vibrate the portable device 100 wholly or only a part of the portable device 100 locally.

According to an embodiment of the present disclosure, the vibration motor 164 may output a haptic feedback corresponding to the user selecting a shortcut icon representing the last operated camera. Further, the vibration motor 164 may receive various haptic feedbacks (for example, the strength and duration of vibrations) pre-stored or received externally based on a control command from the controller 110.

The connector 165 may be used as an interface between the portable device 100, and an external device or a power source. For example, the connector 165 may include a micro universal serial bus (USB)-type connector or a USB-C-type connector.

The keypad 166 may receive a user input corresponding to the control of the portable device 100. The keypad 166 includes a physical keypad formed on the front or rear surface of the portable device 100 and a keypad displayed on the touch screen 190. Further, the keypad 166 may further include a keypad or keyboard that uses a short-range communication protocol or is connectable by cable.

The input pen 167 may be insertable/extendable into/from a side surface of the portable device 100. With the input pen 167, the user may select (for example, by touching), write, and draw (for example, paint or sketch) on the touch screen or an object (for example, a menu, text, an image, a video, a figure, an icon, and a shortcut icon) and/or content (for example, a text file, an image file, an audio file, a video file, payment information, a Web page, and the like) included in or displayed by a write/draw application screen (for example, a memo screen, a note pad screen, a calendar screen, and the like) displayed on the touch screen 190.

The sensor unit 170 may determine the state and/or ambient state of the portable device 100. The sensor unit 170 may include one or more sensors. The sensor unit 170 may include the proximity sensor 171 for detecting the presence of the portable device 100 in the vicinity, the illumination sensor 171 for detecting the intensity of ambient light, and a finger print sensor 173 for acquiring or capturing a fingerprint of the user.

The sensor unit 170 may further include a sensor for detecting the inclination or angle of the portable device 100, a motion sensor for detecting a motion of the portable device 100, an accelerometer sensor, a geomagnetic sensor, a gyro sensor, and the like. The sensor unit 170 may further include a biometric signal sensor including a heartbeat sensor.

Sensors of the sensor unit 170 may detect a user state (for example, a body temperature, the number of heart beats, brainwaves, and the like) and a state of the portable device 100, generate electrical signals corresponding to the detected states, and transmit the electrical signals to the controller 110.

Those skilled in the art will readily understand that a sensor may be added to, modified in, and removed from the sensor unit 170 depending on the desired performance of the portable device 100.

The storage 175 may store input/output signals and data in correspondence with operations of the components 110 to 195 under the control of the controller 110. The storage 175 may store a control program for the control of the portable device 100 and the controller 110, a GUI related to an application provided by a manufacturer or downloaded from the outside, images corresponding to a GUI, user information, text, databases, and related data.

The storage 175 may store a user perceivable visual feedback (for example, a video source) output in correspondence with providing of feedback corresponding to determined characteristics of a second area, a user-perceivable auditory feedback (for example, a sound source) output through the speaker 163, and a user-perceivable haptic feedback (for example, a haptic pattern) output from the vibration motor 164.

The storage 175 may store information about a feedback duration (for example, 500 ms) to the user.

In an embodiment of the present disclosure, the term "storage" may include the storage 175, the ROM 112 and the RAM 113 of the controller 110, and a memory card (for example, a micro secure digital (SD) card) installed to the portable device 100. The storage 175 may include a non-volatile memory, a volatile memory, a hard disk drive (HDD), a solid state drive (SSD), and the like.

The power supply 180 may supply power to the components 110 to 195 of the portable device 100 under the control of the controller 110. The power supply 180 may supply power received from an external power source through a cable connected to the connector 165 to each component of the portable device 100 under the control of the controller 110. In addition, the power supply 180 may charge one or more batteries 185 under the control of the controller 110.

The power supply 180 may supply power charged in the battery 185 to an accessory device (for example, a clock) through a cable. Further, the power supply 180 may wirelessly charge another device (for example, another portable device, an accessory device, and the like) by a transmission coil electrically connected to the battery 185 under the control of the controller 110. The wireless charging may be performed by a magnetic resonance scheme, an electromagnetic wave scheme, a magnetic induction scheme, and the like.

The touch screen 190 may provide the user with GUIs corresponding to various services (for example, voice call, video call, data transmission, broadcasting reception, photo taking, video viewing, electronic payment including mobile payment, and the like). The touch screen 190 includes a touch panel for receiving a user input (for example, touch) and a display panel for displaying a screen. Further, the touch screen 190 may include an edged touch panel for receiving a user input and an edged display panel for displaying a screen.

The touch screen 190 may transmit an analog signal corresponding to a single touch or a multi-touch received through the home screen 191, and a GUI to the touch screen controller 195. The touch screen 190 may receive a single touch or a multi-touch through a user's body (for example, a finger), and the input pen 167.

According to an embodiment of the present disclosure, the touch screen 190 may output a visual feedback corresponding to switching to a shortcut icon representing the last operated camera. In an embodiment of the present disclosure, the term 'display unit' may mean the touch screen 190.

The touch screen controller 195 converts an analog signal corresponding to a single touch or a multi-touch received from the touch screen 190 to a digital signal, and transmits the digital signal to the controller 110. The controller 110 may calculate the position (for example, X and Y coordinates) of the touch on the touch screen 190 by the digital signal received from the touch screen controller 195.

The controller 110 may control the touch screen 190 by using the digital signal received from the touch screen controller 195. For example, the controller 110 may display a shortcut icon or icon selected on the touch screen by the input touch, in such a manner that the shortcut icon may be distinguished from other shortcut icons, execute an application (for example, a game application) corresponding to the selected shortcut icon, and display an application screen on the touch screen 190.

Those skilled in the art will readily understand that at least one component (for example, an additional touch screen) may be added to, at least one component (for example, a component indicated by a dotted line in FIG. 2) may be deleted from, and at least one component may be modified in the portable device 100 illustrated in FIGS. 1A, 1B, and 2 without departing from the scope of this disclosure.

Figure 3:
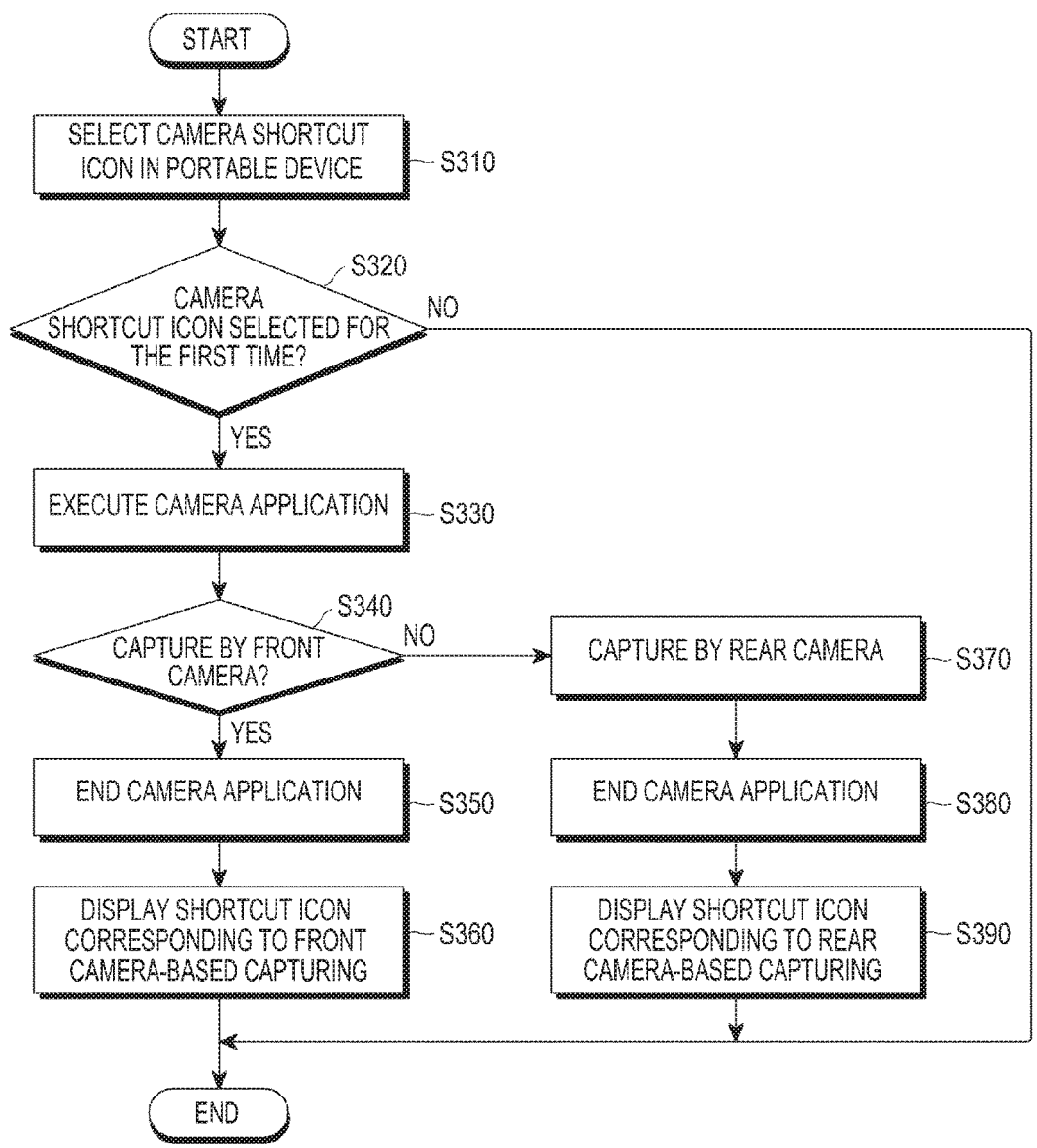
FIG. 3 is a flowchart illustrating a method for controlling a screen in a portable device according to an embodiment of the present disclosure.

FIG. 3 is a flowchart illustrating a method for controlling a screen in a portable device according to an embodiment of the present disclosure.

FIGS. 4A to 4K are views illustrating a method for controlling a screen in a portable device according to an embodiment of the present disclosure.

In step S310 of FIG. 3, a camera shortcut icon is selected in the portable device.

Figure 4A:
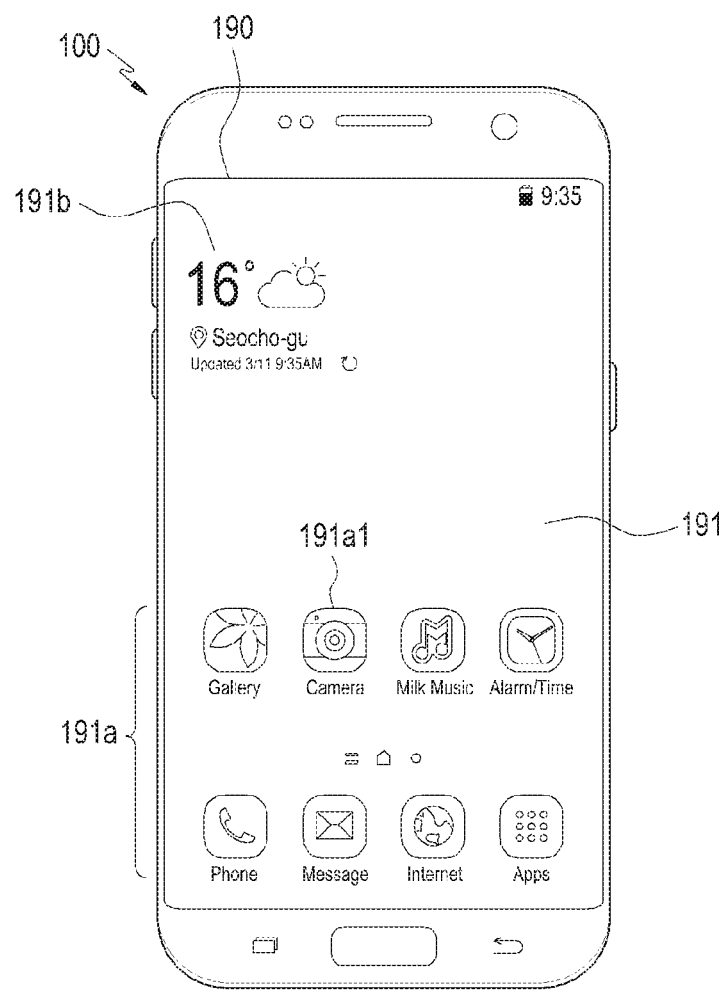
FIGS. 4A to 4K are views illustrating a method for controlling a screen in a portable device according to an embodiment of the present disclosure.
Figure 4B:
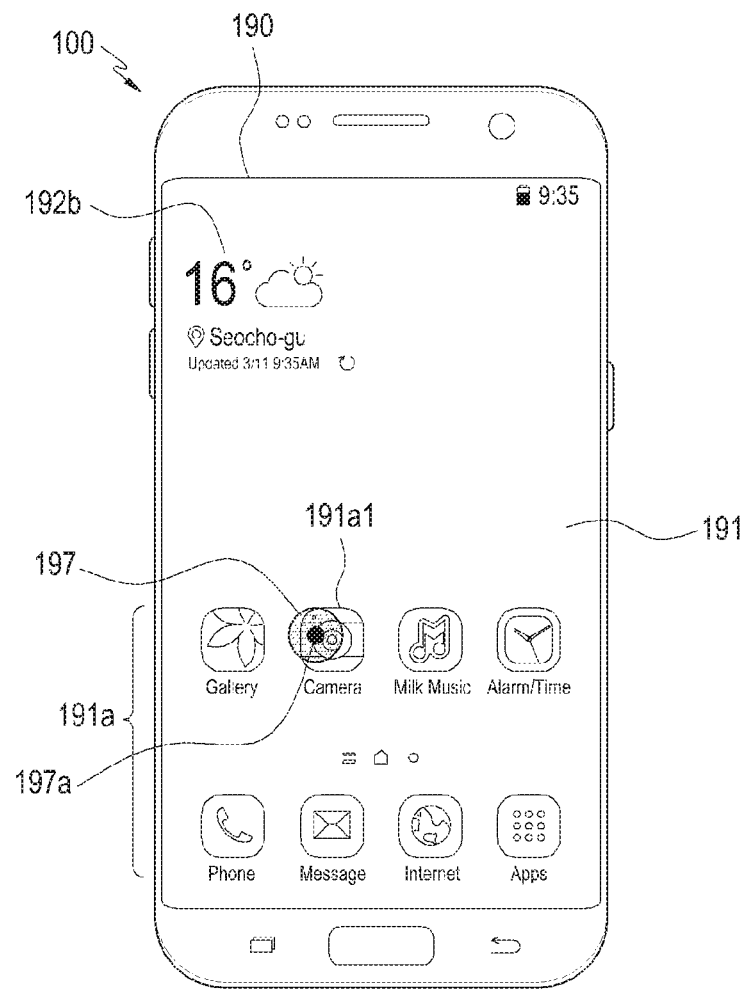

Referring to FIGS. 4A and 4B, the home screen 191 is displayed in the portable device 100. One or more shortcut icons 191a and the widget 191b may be displayed on the home screen 191.

A user may select one (for example, a shortcut icon 191a representing a camera application) of the shortcut icons 191a1 displayed on the home screen 191, such as by a first user input 197. The shortcut icon 191a representing the camera application may be a shortcut icon provided by a mobile OS, a shortcut icon provided by the manufacturer of the portable device 100, or an externally downloaded shortcut icon.

In an embodiment of the present disclosure, a shortcut icon 191a1 representing the camera application will be described as a shortcut icon provided by a mobile OS.

In an embodiment of the present disclosure, a user input may include a touch on a shortcut icon, hovering, pressing, a voice, a motion, and the like.

The controller 110 may detect the first user input 197, using the touch screen 190 and the touch screen controller 195. The controller 110 may calculate the position 197a using (X1, Y1) coordinates of the first user input 197, using an electrical signal received from the touch screen controller 195.

In step S320 of FIG. 3, it is determined whether the camera shortcut icon has been selected for the first time.

The controller 110 may determine a camera shortcut icon corresponding to the calculated position 197a of the first user input 197. The controller 110 may store shortcut icon selection information corresponding to the selection of the shortcut icon 191a in the storage 175. Stored shortcut icon selection information may include a shortcut icon ID for history management, a shortcut icon name, a shortcut icon position, a shortcut icon selection count (by which initial selection may be determined), the name of an application to be executed, the position of the application to be executed, the shortcut icon touch information (for example, a touch input, a touched position, a touch duration), and the like.

The above described items of shortcut icon selection information are examples, and an item may be added, modified, and/or deleted in correspondence with a selected shortcut icon.

Shortcut icon selection information may be stored as an individual file in correspondence with selection of each shortcut icon. Further, a plurality of pieces of shortcut icon selection information may be integrated in one file.

The controller 110 may determine whether the shortcut icon 191a1 has been selected for the first time, based on the shortcut icon selection information.

If the shortcut icon has been selected for the first time in step S320 of FIG. 3, the procedure goes to step S330 of FIG. 3. On the other hand, if the shortcut icon has not been selected for the first time in step S320 of FIG. 3, the procedure ends.

In step S330 of FIG. 3, the camera application is executed.

The controller 110 may execute the camera application corresponding to the first user input. The controller 110 may execute the camera application corresponding to the position of the first user input. The controller 110 may control the display of a camera application screen on the touch screen 190 in correspondence with the first user input. Upon initial execution of the camera application, the controller 110 may control operation of the rear camera 152. The controller 110 may also control operation of the front camera 151. Activation of the first and second cameras 151 and 152 depends on a configuration of the portable device 100.

If the rear camera 152 is operated, an image or video captured through the rear camera 152 may be displayed on the camera application screen.

In step S340 of FIG. 3, the front camera captures an image or video.

Figure 4C:
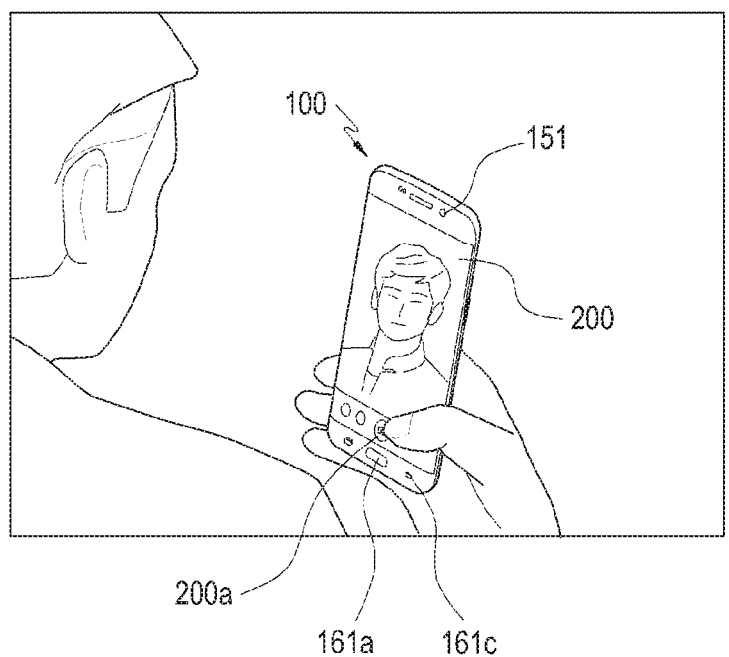

Referring to FIG. 4C, the user may take a picture or video using the front camera 151. The user may take a picture or video by setting the electronic device to use the front camera 151. For example, items that may be set may include the resolution, focus, iris value, flash on/off/auto, high dynamic range (HDR) on/off/auto, brightness, out-of-focus, panoramic shot, food shot, slow motion of the front camera, and the like.

The user may take a picture, using a capture button 200a displayed on a camera application screen 200, a replacement button (for example, a physical camera button) for the capture button 200a, and the like.

The user may take a picture or a video using the front camera 151 and the capture button 200a displayed on the camera application screen. The controller 110 may display the captured image on the camera application screen 200.

The controller 110 may store the picture or video captured by means of the front camera 151 in the storage 175. The stored picture or video may have one or more property values such as a resolution. Further, the controller 110 may store operation information about the front camera 151 (for example, an ID, name of the front camera 151, and the like) that has captured the picture or video.

The operation information about the front camera 151 may be stored as an individual file. The operation information about the front camera 151 may be stored in one integrated file, including the front camera operation information and rear camera operation information.

If a picture is not taken by the front camera in step S340 of FIG. 3, the procedure goes to step 370 of FIG. 3.

In step S350 of FIG. 3, the camera application ends.

Figure 4D:
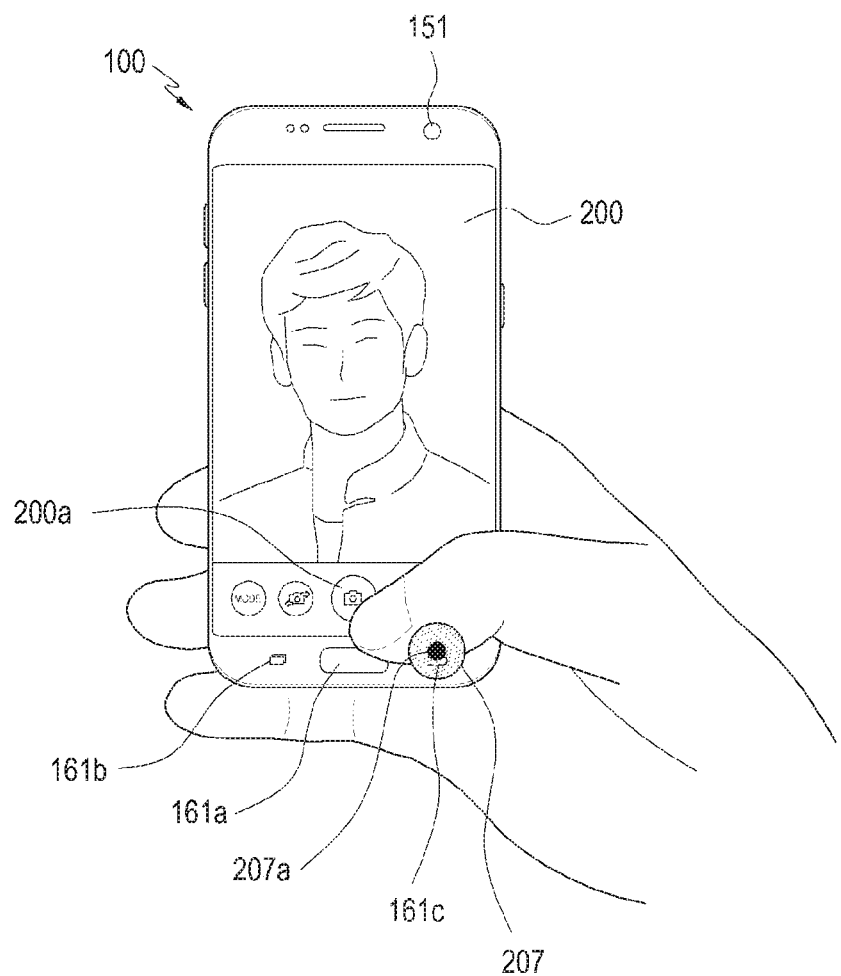

Referring to FIG. 4D, the user selects the back button 161c (for example, by a second user input 207). The controller 110 may detect the second user input 207 by means of the touch screen 190 and the touch screen controller 195.

The controller 110 may calculate the position 207a using (X2, Y2) coordinates of the second user input 207, using an electrical signal received from the touch screen controller 195.

The controller 110 may end the camera application in correspondence with the second user input 207. The camera application for the front camera 151 may end by an input from the user (for example, another button, a menu of the camera application, a voice, a motion, and the like) other than the above-described selection of the back button 161c.

If the camera application ends, the controller 110 may reset one or more settings such as the resolution of the front camera 151 used for capturing. If the camera application ends, the controller 110 may identify the last camera operated before the termination of the camera application, using the front camera operation information.

In step S360 of FIG. 3, a shortcut icon corresponding to front camera based capturing is displayed.

Figure 4E:
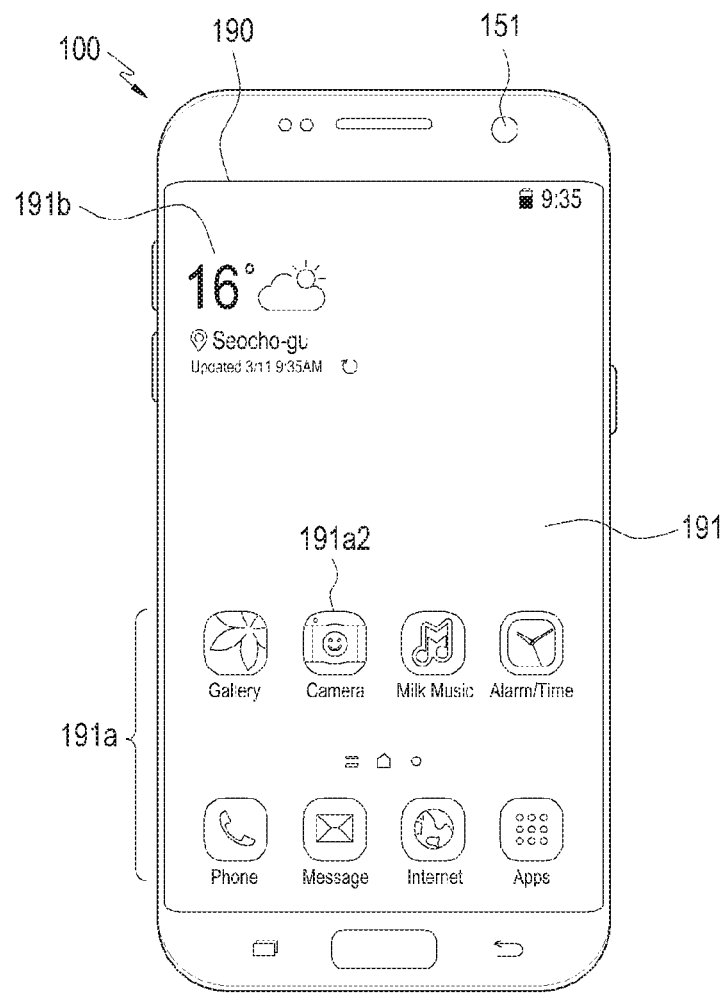

Referring to FIG. 4E, as the camera application ends, the controller 110 may control changing of the shortcut icon representing the camera application displayed on the home screen 191. As the camera application ends, the controller 110 may change the shortcut icon 191a1 representing the camera application displayed on the home screen 191 to a shortcut icon 191a2 representing that the front camera was used last. Further, the controller 110 may change the shortcut icon 191a1 representing the camera application in FIG. 4A to the different shortcut icon 191a2 illustrated in FIG. 4E.

The changed shortcut icon 191a2 may be distinguished from the previous shortcut icon 191a1. The distinction may be made by changing the color, font, size, shape, character of a shortcut icon, and the like.

The changed shortcut icon 191a2 may be at the same position as that of the previous shortcut icon 191a1 (for example, a replacement). If the position of the changed shortcut icon 191a2 is identical to the position of the previous shortcut icon 191a1, the previous shortcut icon 191a1 may disappear (for example, may not be displayed). Further, the changed shortcut icon 191a2 may be at any other position spaced from the position of the previous shortcut icon 191a1. Both the changed shortcut icon 191a2 and the previous shortcut icon 191a1 may be displayed.

If the user wants to capture an image through the front camera 151, the user may select the changed shortcut icon 191a2. The controller 110 may control immediate operation of the front camera 151 in response to the selection of the shortcut icon 191a2. Further, the controller 110 may execute the camera application and control operation of the front camera 151 in response to the selection of the shortcut icon 191a2.

Selection of the changed shortcut icon 191a2 shortens the time for preparing for capturing through the front camera

151, compared to the time for preparing for capturing through the front camera 151 by selecting the previous shortcut icon 191a1. If the user selects the changed shortcut icon 191a2, the user may reduce the time required to capture through the front camera 151.

If the changed shortcut icon 191a2 is displayed on the home screen 191, the user may intuitively identify the last operated camera (for example, the front camera).

The controller 110 may provide the user with a feedback corresponding to the change to the shortcut icon 191a2 representing the last operated camera. The feedback may be one of a visual feedback, an auditory feedback, and a haptic feedback. Further, the controller 110 may provide the user with a combination of two or more of the visual feedback, the auditory feedback, and the haptic feedback.

The visual feedback may include a visual effect (for example, a separate image or an animation effect such as fading of the separate image) corresponding to the change to or display of the shortcut icon 191a2 representing the last operated camera.

The camera 110 may display the visual feedback on the touch screen 190. The controller 110 may display the visual feedback on one of the main touch screen 190a, the first edged touch screen 190b, and the second edged touch screen 190c. Further, the controller 110 may display the visual feedback on a combination of two or more of the main touch screen 190a, the first edged touch screen 190b, and the second edged touch screen 190c.

The auditory feedback may include a sound corresponding to the change to or display of the shortcut icon 191a2 representing the last operated camera. The controller 110 may output the auditory feedback through the speaker 163.

The haptic feedback may include vibrations corresponding to the change to or display of the shortcut icon 191a2 representing the last operated camera. The controller 110 may output the haptic feedback through the vibration motor 164.

A feedback duration (for example, 500 ms) provided to the user may be changed by an environment setting. At least one of a plurality of feedbacks (for example, a visual feedback, an auditory feedback, and a haptic feedback) may be provided in response to the change to or display of the shortcut icon 191a2 representing the last operated camera on the home screen 191.

In step S350 of FIG. 3, if the shortcut icon representing the last operated front camera is displayed, the method for controlling a screen in a portable device ends.

If an image or video is not to be taken through the front camera in step S340 of FIG. 3, the procedure goes to step S370 of FIG. 3.

In step S370 of FIG. 3, the rear camera is operated.

Figure 4F:
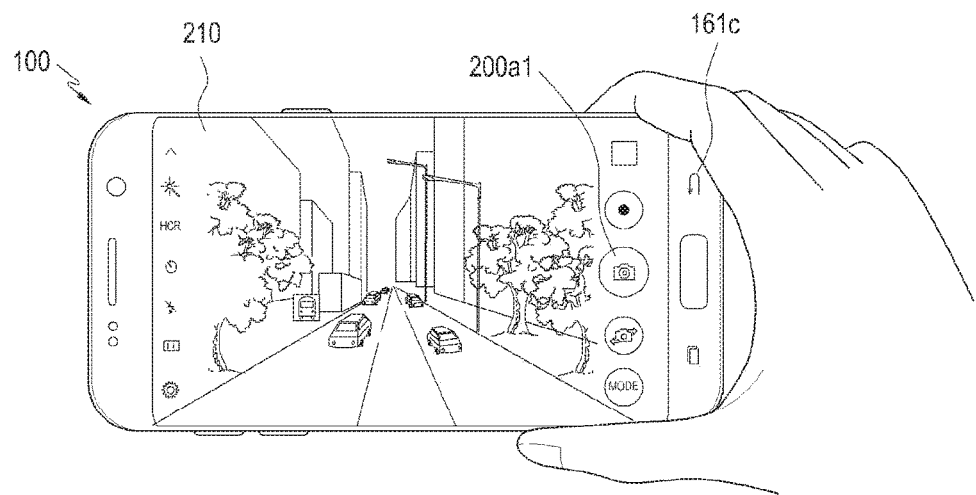

Referring to FIG. 4F the user may take a picture using the rear camera 152. The user may take a picture by setting the electronic device 100 to use the rear camera 152. For example, items that may be set may include the resolution, focus, an iris value, flash on/off/auto, HDR on/off/auto, brightness, out-of-focus, panoramic shot, food shot, slow motion of the rear camera, and the like.

The user may take a picture, using a capture button 200a1 displayed on a camera application screen 210, and a replacement button (for example, a physical camera button) for the capture button 200a1.

The user may take a picture or a video, using the rear camera 152 and the capture button 200a1 displayed on the camera application screen 210. The controller 110 may display the captured image on the camera application screen 210.

The controller 110 may store the picture or video captured by means of the rear camera 152 in the storage 175. The stored picture may have one or more property values. Further, the controller 110 may store operation information about the rear camera 152 (for example, an ID, name of the rear camera 152, and the like) that has captured the picture.

Similar to the front camera operation information, the operation information about the rear camera may be stored as an individual file. The operation information about the rear camera may be stored in one integrated file (including the front camera operation information and rear camera operation information).

In step S380 of FIG. 3, the camera application ends.

Figure 4G:
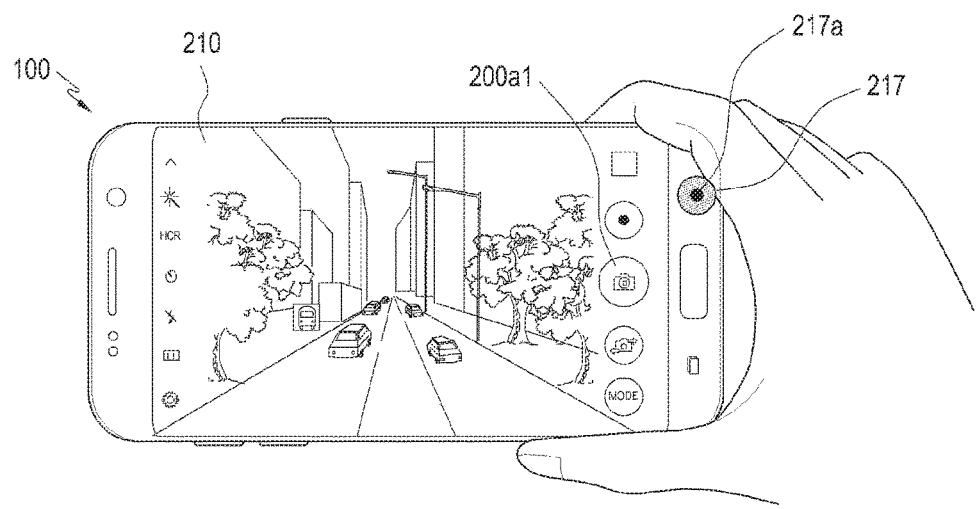

Referring to FIG. 4G, the user selects the back button 161c (for example, by a third user input 217) in a similar manner to step S350 of FIG. 3. The controller 110 may detect the third user input 217 by means of the touch screen 190 and the touch screen controller 195.

The controller 110 may calculate the position 217a using (X3, Y3) coordinates of the third user input 217, using an electrical signal received from the touch screen controller 195.

The controller 110 may end the camera application in response to the third user input 107. The camera application for the rear camera 152 may end by an input (for example, another button, a menu of the camera application, a voice, a motion, and the like) other than the above described selection of the back button 161c.

If the camera application ends, the controller 110 may reset one or more settings of the rear camera 152 used for capturing, in a similar manner to reset of the settings of the front camera 151. If the camera application ends, the controller 110 may identify the last camera operated before the termination of the camera application, using the rear camera operation information.

In step S390 of FIG. 3, a shortcut icon corresponding to rear camera based capturing is displayed.

Figure 4H:
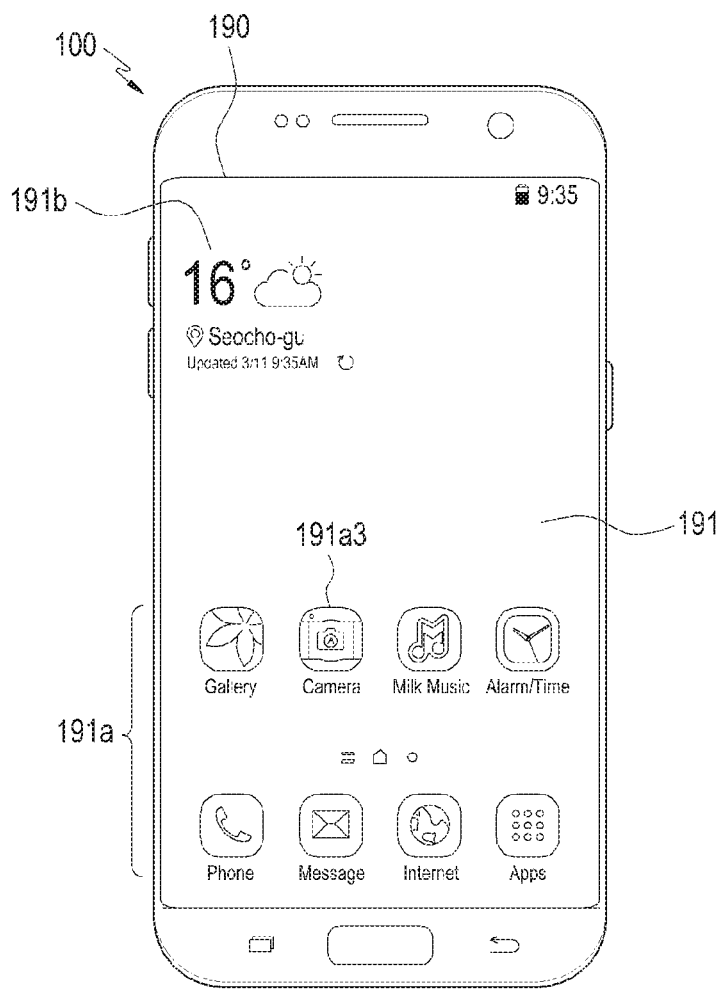

Referring to FIG. 4H, as the camera application ends, the controller 110 may control changing of the shortcut icon representing the camera application displayed on the home screen 191. As the camera application ends, the controller 110 may change the shortcut icon 191a1 representing the camera application displayed on the home screen 191 to a shortcut icon 191a3 representing the last operated rear camera. Further, the controller 110 may change the shortcut icon 191a1 representing the camera application in FIG. 4A to the different shortcut icon 191a3 illustrated in FIG. 4H.

The changed shortcut icon 191a3 may be distinguished from the previous shortcut icon 191a1. The changed shortcut icon 191a3 may also be distinguished from the shortcut icon 191a2 representing the front camera 151. The distinction may be made by changing the color, font, size, shape, character of a shortcut icon, and the like.

The changed shortcut icon 191a3 may be at the same position as the previous shortcut icon 191a1 (for example, a replacement). If the position of the changed shortcut icon 191a3 is identical to the position of the previous shortcut icon 191a1, the previous shortcut icon 191a1 may disappear (for example, may not be displayed). Further, the changed shortcut icon 191a3 may be at any other position spaced from the position of the previous shortcut icon 191a1. Both the changed shortcut icon 191a3 and the previous shortcut icon 191a1 may be displayed.

If the user wants to capture an image through the rear camera 152, the user may select the changed shortcut icon 191a3. The controller 110 may control operation of the rear camera 152 in response to the selection of the shortcut icon

191*a*3. Further, the controller 110 may execute the camera application and control operation of the rear camera 152 in response to the selection of the shortcut icon 191*a*3.

Selection of the changed shortcut icon 191*a*3 shortens the time for preparing for capturing through the rear camera 152, compared to the time for preparing for capturing through the rear camera 152 by selecting the previous shortcut icon 191*a*1. If the user selects the changed shortcut icon 191*a*3, the user may reduce the time required to capture through the rear camera 152.

If the changed shortcut icon 191*a*3 is displayed on the home screen 191, the user may intuitively identify the last operated camera (for example, the rear camera).

The controller 110 may provide the user with a feedback corresponding to the change to the shortcut icon 191*a*3 representing the last operated camera. The feedback may be one of a visual feedback, an auditory feedback, and a haptic feedback. Further, the controller 110 may provide the user with a combination of two or more of the visual feedback, the auditory feedback, and the haptic feedback.

A feedback corresponding to the change to or display of the shortcut icon 191*a*3 representing the last operated camera on the home screen 191 is provided in step S390 of FIG. 3 in a similar manner to for a feedback corresponding to the change to or display of the shortcut icon 191*a*2 representing the last operated camera on the home screen 191 in step S360 of FIG. 3. Therefore, the description is not provided again.

In an embodiment of the present disclosure, the number of icons representing the last operated camera may be equal to the number of cameras configured in the portable device 100. For example, if the portable device 100 has the front camera 151 and the rear camera 152, the two shortcut icons 191*a*2 and 191*a*3 representing a last operated front camera 151 and rear camera 152, respectively, may be defined. Further, if the portable device 100 has the front camera 151 and the dual rear camera 152 with the cameras 152*a* and 152*b*, three shortcut icons 191*a*2, 191*a*4, and 191*a*5 representing a last operated front camera 151, and dual rear cameras 152*a* and 152*b*, respectively, may be defined.

In another embodiment of the present disclosure, the shortcut icons 191*a*1 and 191*a*2 representing the last operated camera may be integrated into a first single shortcut icon. The first single shortcut icon may be configured in the same size (a horizontal length and a vertical length, referred to as a 'first size') as the shortcut icons 191*a*1 and 191*a*2.

The first single shortcut icon may be divided into a left area (for example, ½ of the first size) and a right area (for example, ½ of the first size) with respect to the center point or a line passing through the center point of the first single shortcut icon of the first size.

The left area may include a character (for example, a shape, a font, and the like) representing the rear camera. The character representing the rear camera may be smaller in size than the character of the previous shortcut icon 191*a*1. The right area may include a character representing the front camera. The character representing the front camera may be a smaller size than the character of the previous shortcut icon 191*a*1 (for example, 80% or less of the size of the character of the previous shortcut icon 191*a*1).

The user may select (for example, by touch) one of the left and right areas of the first single shortcut icon. The controller may control operation of one of the front or rear cameras corresponding to the selected one of the left and right areas. Further, the controller 110 may execute the camera application and control operation of the camera corresponding to the selected one of the left and right areas.

In another embodiment of the present disclosure, a second single shortcut icon may be displayed, which is identical to the first single shortcut icon in area but different from the first single shortcut icon in size (for example, a shorter vertical length and a longer horizontal length than those of the first single shortcut icon). Like the first single shortcut icon, the second single shortcut icon may be divided into left and right areas. Since the second single shortcut icon is similar to the first single shortcut icon except for, for example, their different sizes, a description of the second single shortcut icon will not be provided again.

In another embodiment of the present disclosure, a widget may be displayed, which is identical to the first single shortcut icon in area but different from the first single shortcut icon in size (for example, a shorter vertical length and a longer horizontal length than those of the first single shortcut icon). Similar to the first single shortcut icon, the widget may be divided into left and right areas. The user may select one of the left and right areas of the widget. The controller 110 may control operation of a camera corresponding to the selected area. Further, the controller 110 may execute the camera application and control operation of the camera corresponding to the selected area.

Figure 4I:
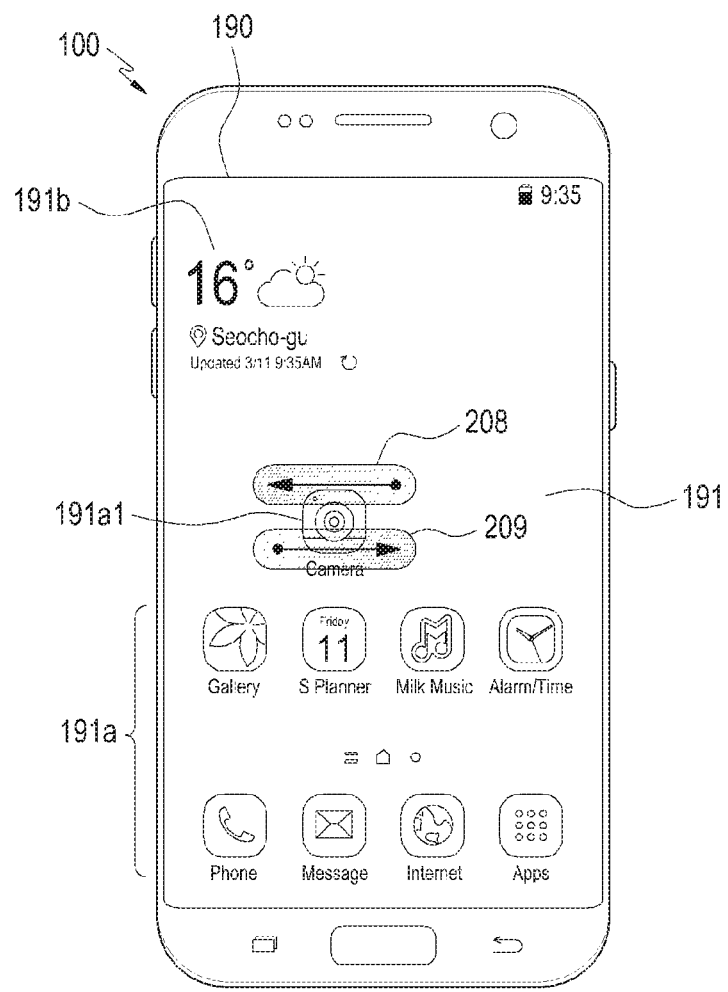

Referring to FIG. 4I illustrating another embodiment of the present disclosure, one of the front camera 151 and the rear camera 152 may be operated by touching (for example, tapping, double-tapping, and the like) the shortcut icon 191*a*1 representing the camera application or applying a touch gesture (for example, a drag, swipe, flick, and the like) to the shortcut icon 191*a*1 on the home screen 191 of FIG. 4A.

If the user taps the shortcut icon 191*a*1, the controller 110 may control operation of the front camera 151. Further, if the user taps the shortcut icon 191*a*1, the controller 110 may execute the camera application and control operation of the front camera 151.

If the user double-taps the shortcut icon 191*a*1, the controller 110 may control operation of the rear camera 152. Further, if the user double-taps the shortcut icon 191*a*1, the controller 110 may execute the camera application and control operation of the rear camera 152.

In the case where the rear camera 152 is a dual camera (refer to FIG. 1B), if the user double-taps the shortcut icon 191*a*1, the controller 110 may control operation of one (for example, camera 152*a*) of the cameras from the dual camera 152. Further, if the user double-taps the shortcut icon 191*a*1, the controller 110 may execute the camera application and control operation of one (for example, camera 152*a*) of the cameras from the dual camera 152.

In the case where the rear camera 152 is a dual camera (refer to FIG. 1B), if the user triple-taps the shortcut icon 191*a*1, the controller 110 may control operation of the other one (for example, camera 152*b*) of the cameras from the dual camera 152. Further, if the user triple-taps the shortcut icon 191*a*1, the controller 110 may execute the camera application and control operation of the other one (for example, camera 152*b*) of the cameras from the dual camera 152.

The user may input a touch gesture to the shortcut icon 191*a*1. The controller 110 may detect the direction of the touch gesture and determine or select one of the front and rear cameras 151 and 152 to operate.

If the user swipes the shortcut icon 191*a*1, the controller 110 may control the front camera 151. For example, if the user inputs a left swipe 208 to the shortcut icon 191*a*1, the controller 110 may execute the camera application and control the front camera 151.

If the user swipes the shortcut icon 191a1, the controller 110 may control the rear camera 152. For example, if the user inputs a right swipe 209 to the shortcut icon 191a1, the controller 110 may execute the camera application and control the rear camera 152.

The above described direction of a touch gesture is an example, and a swipe may be applied in the opposite direction. For example, if the right swipe 209 is applied to shortcut icon 191a1, the controller 110 may control the front camera 151. Further, the direction of the touch gesture may be upward (for example, the front camera 151 is operated) or downward (for example, the rear camera 152 is operated).

The above described touch gesture is an example, and a rotation, spreading, pinch, a touch gesture, and the like capable of operating the cameras 151 and 152 is within the scope of the present disclosure.

Figure 4J:
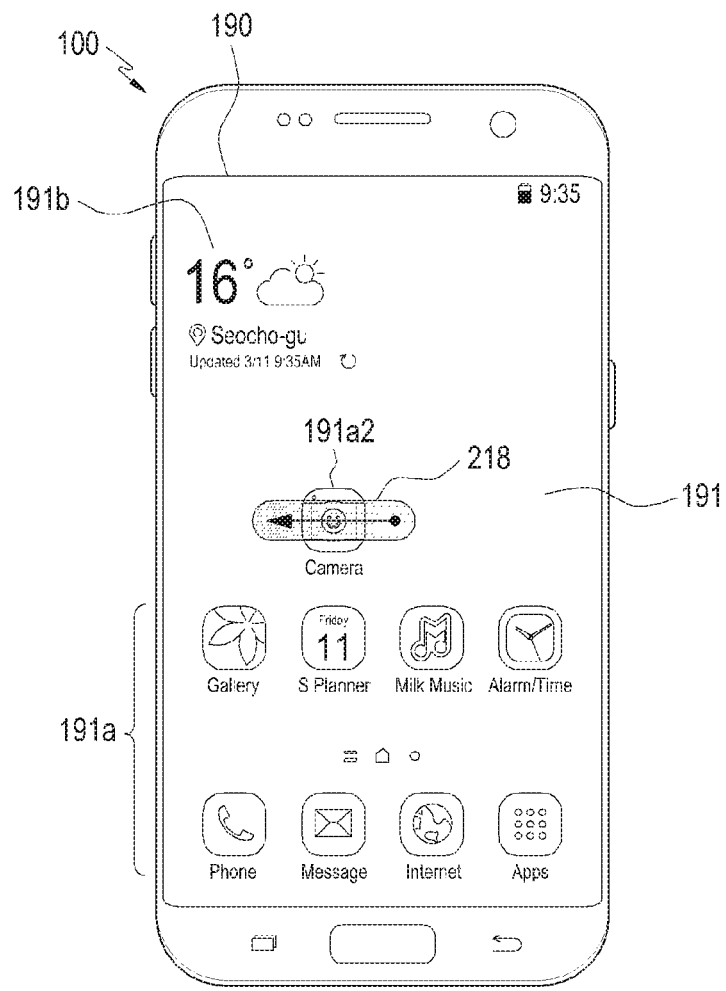

Referring to FIG. 4J illustrating another embodiment of the present disclosure, the rear camera 152 may be operated by touching (for example, tapping, double-tapping, and the like) the shortcut icon 191a2 representing the front camera 151 or applying a touch gesture (for example, a drag, a swipe, a flick, and the like) to the shortcut icon 191a2.

The user may touch the shortcut icon 191a2 representing the front camera 151.

If the user double-taps the shortcut icon 191a2 representing the front camera 151, the controller 110 may control the rear camera 152. If the user double-taps the shortcut icon 191a2 representing the front camera 151, the controller 110 may execute the camera application and control the rear camera 152.

The user may input a touch gesture to the shortcut icon 191a2 representing the front camera 151. The controller 110 may detect the touch gesture or the direction of the touch gesture and thus control the rear camera 152.

If the user double-taps the shortcut icon 191a3 representing the rear camera 152, the controller 110 may control the front camera 151.

If the user swipes the shortcut icon 191a2 representing the front camera 151, the controller 110 may control the rear camera 152. For example, if the user inputs a left swipe 218 to the shortcut icon 191a2 representing the front camera 151, the controller 110 may execute the camera application and control the rear camera 152.

If the user swipes the shortcut icon 191a3 representing the rear camera 152, the controller 110 may control the front camera 151. For example, if the user inputs a left swipe the shortcut icon 191a3 representing the rear camera 152, the controller 110 may execute the camera application and control the front camera 151.

The above described direction of a touch gesture is an example, and a swipe may be applied in the opposite direction. For example, if the right swipe 209 is applied to the shortcut icon 191a2 representing the front camera 151, the controller 110 may control the rear camera 152. Further, an upward swipe or a downward swipe may be applied to the shortcut icon 191a2 for operating the rear camera 152.

The above described touch gesture is an example, and a rotation, spreading, pinch, touch gesture, and the like capable of operating the cameras 152 is within the scope of the present disclosure.

Figure 4K:
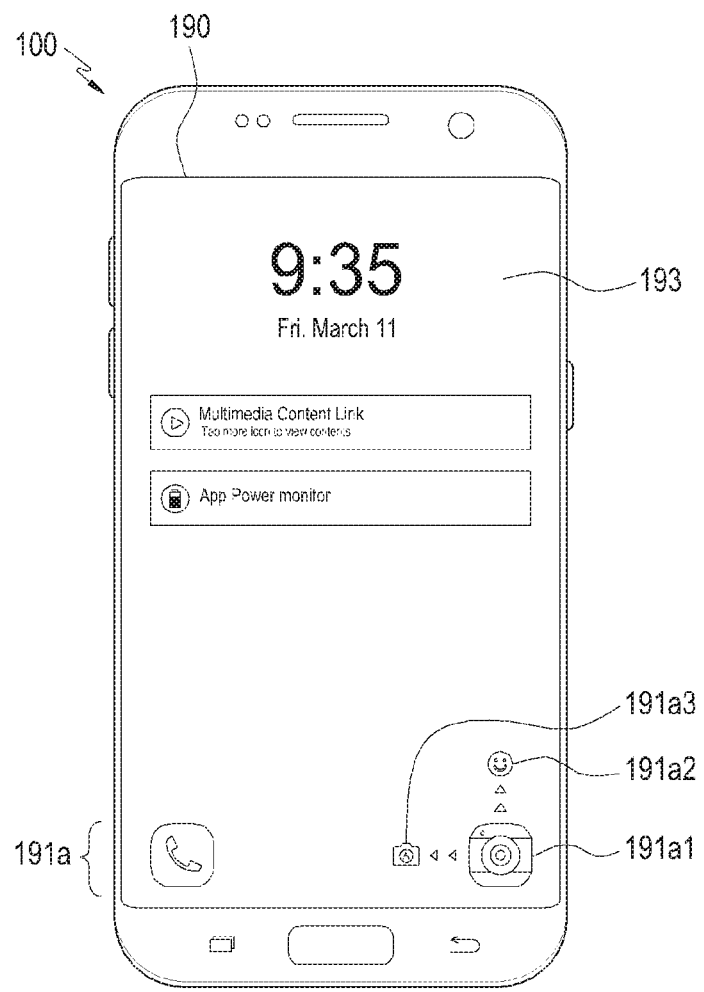

Referring to FIG. 4K illustrating another embodiment of the present disclosure, one of the front camera 151 and the rear camera 152 may be operated by applying a touch gesture to the shortcut icon 191a1 representing the camera application on a locked screen 193.

The user may apply a touch gesture in a direction from the shortcut icon 191a1 toward one of the shortcut icons 191a2 and 191a3. The controller 110 may detect the direction of the touch gesture and determine or select a camera to operate between the front and rear cameras 151 and 152.

If the user applies a touch gesture in a direction from the shortcut icon 191a1 toward the shortcut icon 191a2 representing the front camera 151, the controller 110 may detect the direction of the touch gesture and control the front camera 151. If the user applies a touch gesture from the shortcut icon 191a1 to reach the shortcut icon 191a2 representing the front camera 151, the controller 110 may detect the direction of the touch gesture and control the front camera 151.

If the user applies a touch gesture in a direction from the shortcut icon 191a1 toward the shortcut icon 191a3 representing the rear camera 152, the controller 110 may detect the direction of the touch gesture and control the rear camera 152. If the user applies a touch gesture from the shortcut icon 191a1 to reach the shortcut icon 191a3 representing the rear camera 152, the controller 110 may detect the direction of the touch gesture and control the rear camera 152.

Figure 5A:
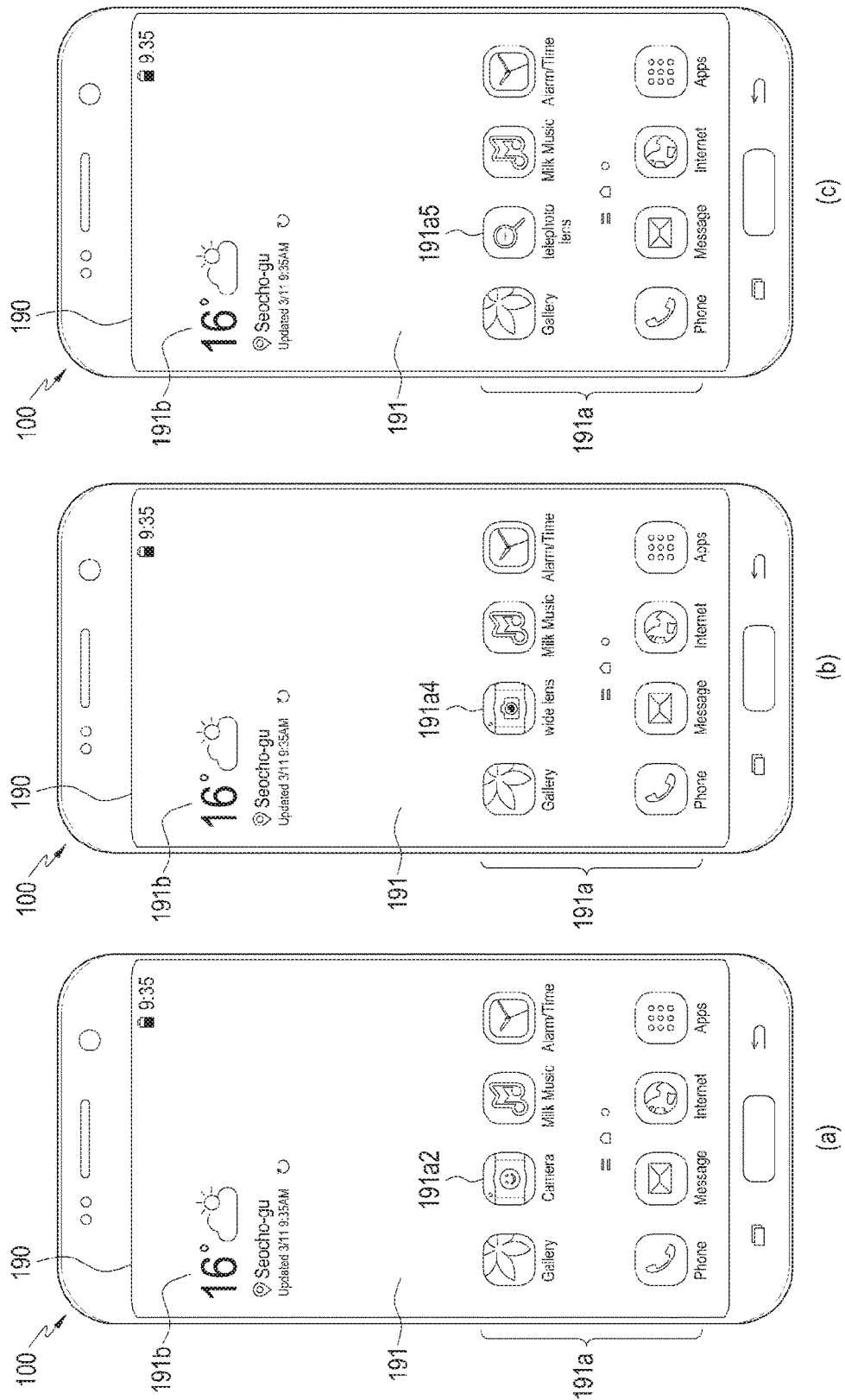
FIGS. 5A and 5B are views illustrating a method for controlling a screen in a portable device according to another embodiment of the present disclosure.
Figure 5B:
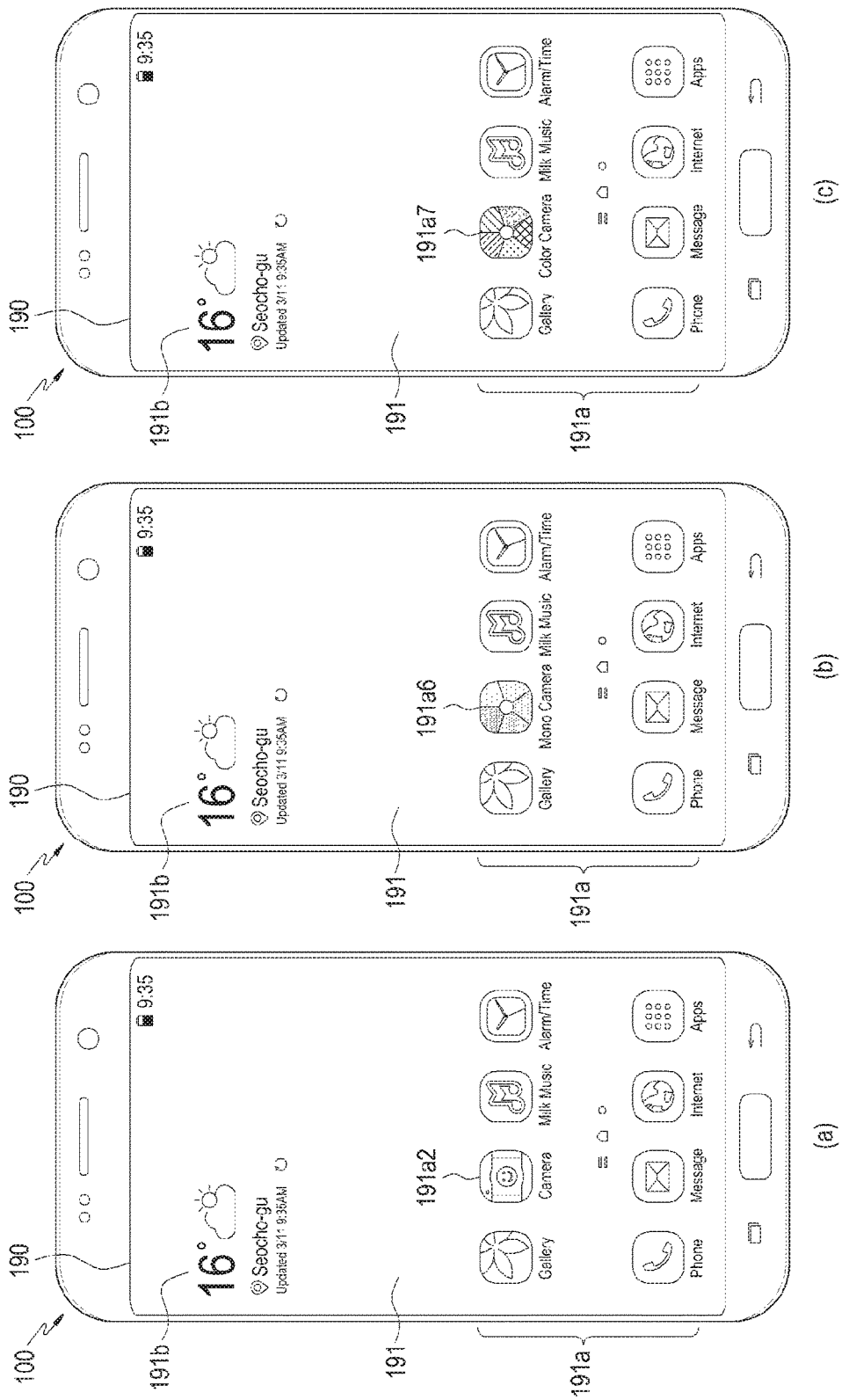

FIGS. 5A and 5B are views illustrating a method for controlling a screen in a portable device according to another embodiment of the present disclosure.

Referring to FIGS. 5A and 5B, the rear camera 152 of the portable device 100 may be a dual camera. The rear camera 152 may include the left rear camera 152a being a wide-angle lens camera and the right rear camera 152b being a telephoto lens camera.

In (b) and (c) of FIG. 5A, if the rear camera 152 of the portable device 100 is a dual camera, two shortcut icons 191a4 and 191a5 may be displayed instead of the single shortcut icon 191a3 representing the rear camera 152 in the foregoing embodiment (refer to FIG. 4H). The two shortcut icons may be the shortcut icon 191a4 representing the left rear camera 152a, and the shortcut icon 191a5 representing the right rear camera 152b.

The two shortcut icons 191a4 and 191a5 representing the two cameras 152a and 152b on the portable device 100 are displayed on the home screen 191, in a similar manner to the display of the single shortcut icon 191a representing the rear camera 152 on the home screen 191. Therefore, the description is not provided again.

Referring to (a) of FIG. 5A, when the user ends the camera application after capturing an image through the front camera 151, the controller 110 may change the shortcut icon 191a1 displayed on the home screen 191 to the shortcut icon 191a2 representing the front camera 151. This is substantially similar to steps S340 to S360 of FIG. 3, and thus will not be described again.

Referring to (b) of FIG. 5A, when the user ends the camera application after capturing an image through the left rear camera 152a, the controller 110 may change the shortcut icon 191a1 displayed on the home screen 191 to the shortcut icon 191a4 representing the left rear camera 152a.

Referring to (c) of FIG. 5A, when the user ends the camera application after capturing an image through the right rear camera 152b, the controller 110 may change the shortcut icon 191a1 displayed on the home screen 191 to the shortcut icon 191a5 representing the right rear camera 152b.

In (a), (b), and (c) of FIG. 5A, the controller 110 may provide the user with a feedback corresponding to change to or display of the shortcut icons 191a2, 191a4, and 191a5 representing the last operated camera on the home screen 191. In (a), (b), and (c) of FIG. 5A, a feedback corresponding to the change to or display of the shortcut icons 191a2, 191a4, and 191a5 corresponding to the last operated camera on the home screen 191 is provided substantially in a similar manner to step S360 of FIG. 3 and thus will not be described again.

Referring to FIGS. 5B and 5B, the rear camera 152 of the portable device 100 may be a dual camera. The rear camera 152 may include the left rear camera 152a being a monochrome camera and the right rear camera 152b being a color camera.

In (b) and (c) of FIG. 5B, if the rear camera 152 of the portable device 100 is a dual camera, two shortcut icons 191a6 and 191a7 may be displayed instead of the single shortcut icon 191a3 representing the rear camera 152 in the foregoing embodiment (refer to FIG. 4H). The two shortcut icons may be the shortcut icon 191a6 representing the left rear camera 152a, and the shortcut icon 191a7 representing the right rear camera 152b.

The two shortcut icons 191a6 and 191a7 representing the two cameras 152a and 152b on the rear surface of the portable device 100 are displayed on the home screen 191, substantially in a similar manner to the display of the single shortcut icon 193a representing the rear camera 152 on the home screen 191. Therefore, the description is not provided again.

Referring to (a) of FIG. 5B, when the user ends the camera application after capturing an image through the front camera 151, the controller 110 may change the shortcut icon 191a1 displayed on the home screen 191 to the shortcut icon 191a2 representing the front camera 151. This is substantially similar to steps S340 to S360 of FIG. 3, and thus will not be described again.

Referring to (b) of FIG. 5B, when the user may end the camera application after capturing an image through the left, monochrome rear camera 152a, the controller 110 may change the shortcut icon 191a1 displayed on the home screen 191 to the shortcut icon 191a6 representing the left rear camera 152a being a monochrome camera.

Referring to (c) of FIG. 5B, when the user may end the camera application after capturing an image through the right, color rear camera 152b, the controller 110 may change the shortcut icon 191a1 displayed on the home screen 191 to the shortcut icon 191a7 representing the right rear camera 152b being a color camera.

In (a), (b), and (c) of FIG. 5B, the controller 110 may provide the user with a feedback corresponding to the change to or display of the shortcut icons 191a2, 191a6, and 191a7 representing the last operated camera on the home screen 191. In (a), (b), and (c) of FIG. 5A, a feedback corresponding to the change to or display of the shortcut icons 191a2, 191a6, and 191a7 representing the last operated camera on the home screen 191 is performed in a similar manner to step S360 of FIG. 3 and thus will not be described again.

In step S390 of FIG. 3, if the shortcut icon representing the last operated rear camera is displayed, the method for controlling a screen in a portable device ends.

As is apparent from the foregoing description, a portable device and a method for controlling a screen in the portable device, which upon termination of a camera application, may provide a shortcut icon representing the last operated camera to a home screen.

A portable device and a method for controlling a screen in the portable device, which upon termination of a camera application, may provide a shortcut icon representing the last operated camera, thereby shortening the time for preparing the camera to capture a image or video.

A portable device and a method for controlling a screen in the portable device, which upon termination of a camera application, may provide a shortcut icon representing the last operated camera, thereby enabling a user to intuitively identify the last operated camera.

According to embodiments of the present disclosure which are not limited to the above, a portable device and a method for controlling a screen in the portable device, which upon termination of a camera application, may provide a shortcut icon representing the last operated camera so that a user may intuitively identify the last operated camera.

The methods according to embodiments of the present disclosure may be implemented as program commands executable by various processors and stored in a computer-readable medium. The computer-readable medium may include program commands, data files, and data structures alone or in combination. For example, irrespective of erasable or rewritable, the computer-readable medium may be one or more of a volatile or non-volatile storage device like ROM, a memory such as RAM, memory chip, integrated circuit (IC), a storage medium which is optically or magnetically recordable, and at the same time, readable by a machine (for example, a computer), like compact disk (CD), digital versatile disk (DVD), magnetic disk, magnetic tape, and the like.

It will be understood that a memory that may be included in a portable device is an example of a machine-readable storage medium suitable for storing a program or programs including instructions for implementing the embodiments of the present disclosure. The program commands written to the medium may be specially designed and configured for the present disclosure or known to those skilled in the art of computer software.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A portable device comprising:
a plurality of cameras;
a touch screen; and
a controller configured to control the plurality of cameras and the touch screen,
wherein the controller is configured to:
display a first shortcut icon representing a camera application on the touch screen without representing a specific camera of the plurality of cameras,
execute the camera application by using a first camera of the plurality of cameras in response to a first user input to the first shortcut icon,
upon termination of execution of the camera application, display a second shortcut icon representing a last operated camera of the plurality of cameras in place of the first shortcut icon,
provide at least one of an auditory feedback and a haptic feedback in response to displaying the second shortcut icon, and
execute the camera application by using the last operated camera in response to a second user input to the second shortcut icon.

2. The portable device of claim 1, wherein a number of second shortcut icons corresponds to a number of the plurality of cameras.

3. The portable device of claim 1, wherein the plurality of cameras include a front camera and at least one rear camera.

4. The portable device of claim 3, wherein the rear camera is a dual camera having two cameras, one of the two cameras is a wide-angle lens camera, and the other camera is a telephoto lens camera.

5. The portable device of claim 3, wherein the rear camera is a dual camera having two cameras, one of the two cameras is a monochrome camera, and the other camera is a color camera.

6. The portable device of claim 1, wherein upon termination of execution of the camera application, the controller is configured to control reset of a setting value applied to the last operated camera.

7. The portable device of claim 1, wherein the controller is configured to control display of the first shortcut icon on one of a home screen and a locked screen.

8. A method for controlling a screen in a portable device having a plurality of cameras, the method comprising:
- displaying a first shortcut icon representing a camera application on a home screen of the portable device, without representing a specific camera of the plurality of cameras;
- receiving a first user input to the first shortcut icon;
- executing the camera application using one of the plurality of cameras;
- terminating the camera application in response to a second user input;
- upon termination of the camera application, displaying a second shortcut icon representing a last operated camera of the plurality of cameras in place of the first shortcut icon; and
- providing at least one of an auditory feedback and a haptic feedback in response to displaying the second shortcut icon, and wherein, upon receipt of a third user input to the second shortcut icon, the last operated camera of the plurality of cameras is operated.

9. The method of claim 8, further comprising determining whether the first shortcut icon has received the first user input for the first time.

10. The method of claim 8, wherein a number of second shortcut icons is equal to a number of the plurality of cameras.

11. The method of claim 8, wherein when the second shortcut icon is displayed, the first shortcut icon disappears.

12. The method of claim 8, wherein when the second shortcut icon is displayed, the second shortcut icon is displayed along with the first shortcut icon.

13. The method of claim 8, wherein upon termination of the camera application, a setting value applied to the last operated camera is reset.

14. The method of claim 8, wherein the third user input includes at least one of a touch, a touch gesture, a voice, and a motion.

15. The method of claim 8, wherein if the second shortcut icon represents a front camera, a rear camera is operated in response to the third user input.

16. The method of claim 8, wherein if the second shortcut icon represents a rear camera, a front camera is operated in response to the third user input.

17. The method of claim 8, wherein the first shortcut icon is displayed on at least one of a home screen and a locked screen.

* * * * *